US012659250B2

(12) United States Patent
Rajamanickam et al.

(10) Patent No.: US 12,659,250 B2
(45) Date of Patent: Jun. 16, 2026

(54) SYSTEMS AND METHODS FOR MEASURING FRAME LOSS IN HIGH-BANDWIDTH SERVICE PROVIDER NETWORKS

(71) Applicant: Cisco Technology, Inc., San Jose, CA (US)

(72) Inventors: Jaganbabu Rajamanickam, Kanata (CA); Sreejith Avikkal, Kanata (CA); Madhan Sankaranarayanan, Chinnamanur (IN); Geetharthi Gopalan, Kanata (CA); Denny Khoerniawan, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/411,319

(22) Filed: Jan. 12, 2024

(65) Prior Publication Data

US 2025/0233815 A1      Jul. 17, 2025

(51) Int. Cl.
*H04L 43/0829*      (2022.01)
*H04L 41/5009*      (2022.01)
*H04L 43/062*      (2022.01)
*H04L 43/067*      (2022.01)
*H04L 43/50*      (2022.01)
*H04L 43/10*      (2022.01)

(52) U.S. Cl.
CPC ........ *H04L 43/0829* (2013.01); *H04L 43/062* (2013.01); *H04L 43/067* (2013.01)

(58) Field of Classification Search
CPC . H04L 43/0829; H04L 43/062; H04L 43/067; H04L 41/5009; H04L 43/50; H04L 43/0841; H04L 43/10
See application file for complete search history.

(56) References Cited

U.S. PATENT DOCUMENTS

| | | | |
|---|---|---|---|
| 9,954,753 B2 | 4/2018 | Li et al. | |
| 11,916,746 B1 * | 2/2024 | Golla | .................. H04L 41/5009 |
| 2007/0263535 A1 | 11/2007 | Shabtay | |
| 2008/0080390 A1 * | 4/2008 | Ebuchi | ................... H04L 43/12 370/253 |
| 2012/0236734 A1 | 9/2012 | Sampath et al. | |
| 2012/0269086 A1 | 10/2012 | Yue et al. | |

(Continued)

FOREIGN PATENT DOCUMENTS

CN      103997433 A  *  8/2014

OTHER PUBLICATIONS

European Search Report for European Application No. 24219123.7, dated May 27, 2025, 8 Pages.

*Primary Examiner* — Kamal M Hossain
(74) *Attorney, Agent, or Firm* — Baker Botts L.L.P.

(57) ABSTRACT

In one embodiment, a method includes determining a replication factor and duplicating one or more original probe packets according to the replication factor, resulting in one or more replicated probe packets. The method also includes transmitting a set of probe packets to a responder device, the set of probe packets including the one or more original probe packets and the one or more replicated probe packets. The method further includes determining a count of one or more reflected probe packets received from the responder device and determining a frame loss measurement based on the count of the one or more reflected probe packets.

20 Claims, 2 Drawing Sheets

(56) References Cited

U.S. PATENT DOCUMENTS

| | | | |
|---|---|---|---|
| 2014/0289405 A1* | 9/2014 | Tychon | H04L 43/50 709/224 |
| 2014/0293799 A1 | 10/2014 | Park et al. | |
| 2016/0380878 A1 | 12/2016 | Bugenhagen et al. | |
| 2017/0310573 A1 | 10/2017 | Cook | |
| 2019/0306047 A1* | 10/2019 | Grosso | H04L 43/16 |
| 2021/0328902 A1* | 10/2021 | Huselton | H04L 43/0817 |

* cited by examiner

SYSTEMS AND METHODS FOR MEASURING FRAME LOSS IN HIGH-BANDWIDTH SERVICE PROVIDER NETWORKS

TECHNICAL FIELD

The present disclosure relates generally to frame loss measurements in data networks, and more specifically to systems and methods for measuring frame loss in high-bandwidth service provider networks.

BACKGROUND

The International Telecommunication Union-Telecommunication Standardization Sector (ITU-T) defines and standardizes various methods for testing and measuring the quality of networks provided by mobile communication providers. ITU-T Y.1564 (referred to as Y.1564) is a particular methodology for testing service activation of a network, and it allows for the complete validation of an Ethernet service-level agreement in a single test. Y.1564 requires the testing of network packets at a rate that matches the maximum bit rate supported by communication links of the tested network.

DESCRIPTION OF EXAMPLE EMBODIMENTS

Overview

Figure 1:
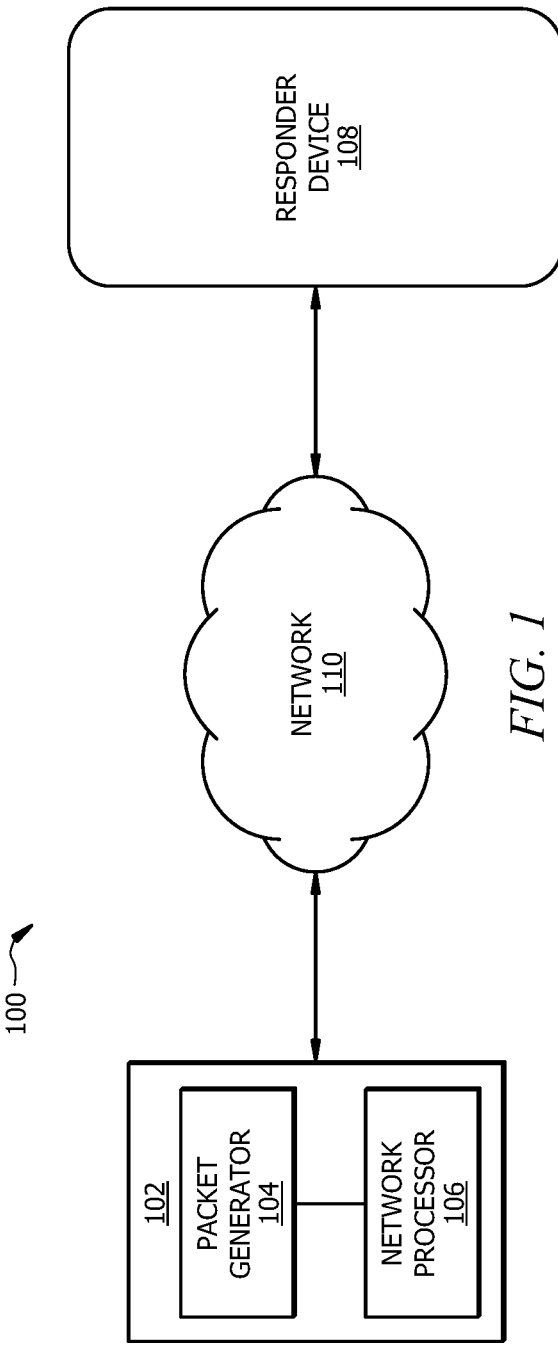
FIG. 1 illustrates an example system for measuring frame loss in high-bandwidth service provider networks.

This disclosure describes systems and methods for measuring frame loss in high-bandwidth service provider networks. The ITU-T Y.1564 method (referred to as Y.1564) for testing an Ethernet service-level agreement requires the testing of network packets at a rate that matches the maximum bit rate supported by communication links of the tested network. However, certain devices that generate the test packets used to perform Y.1564 may be incapable of generating the test packets at the required testing rate. Accordingly, in certain embodiments, a packet generator generates test packets which are then duplicated by a network processor according to a replication factor, resulting in a set of test packets that includes the generated test packets and the duplicated test packets. The network processor then transmits the set of test packets to a responder device, which transmits one or more reflected test packets back to the network processor upon successfully receiving one or more packets of the set of test packets. The network processor may then count the number of reflected test packets it receives from the responder device and determine a frame loss measurement of a network based on this count. This system and method allows for service-level agreement testing by devices that are otherwise incapable of generating the required number of test packets, particularly in high-bandwidth networks.

According to an embodiment, a network component includes one or more processors and one or more computer-readable non-transitory storage media coupled to the one or more processors and including instructions that, when executed by the one or more processors, cause the network component to perform operations. The operations include determining a replication factor and duplicating one or more original probe packets according to the replication factor, resulting in one or more replicated probe packets. The operations also include transmitting a set of probe packets to a responder device, the set of probe packets including the one or more original probe packets and the one or more replicated probe packets. The operations further include determining a count of one or more reflected probe packets received from the responder device and determining a frame loss measurement based on the count of the one or more reflected probe packets.

In some embodiments, determining the replication factor further includes determining a first variable S, where the first variable S equals a supported link bandwidth for transmitting data. In some embodiments, determining the replication factor also includes determining a second variable G, were the second variable G equals an available bandwidth for generating first data and second data. In some embodiments, determining the replication factor further includes determining a replication factor N, wherein the replication factor N equals $(S/G)-1$. In some embodiments, the supported link bandwidth represents a maximum number of bits per second for transmitting data.

In certain embodiments, a reflected probe packet of the one or more reflected probe packets is a frame transmitted by the responder device in response to the responder device receiving a probe packet from the set of probe packets. In some embodiments, determining the count of the one or more reflected probe packets received from the responder device further comprises incrementing a counter by a value of 1 each time a reflected probe packet of the one or more reflected probe packets is received. In certain embodiments, determining the frame loss measurement based on the count further comprises determining a number of probe packets of a particular type that are received from the responder device. In some embodiments, the operations further include determining whether the frame loss measurement complies with a service-level agreement.

According to another embodiment, a method includes determining a replication factor and duplicating one or more original probe packets according to the replication factor, resulting in one or more replicated probe packets. The method also includes transmitting a set of probe packets to a responder device, the set of probe packets including the one or more original probe packets and the one or more replicated probe packets. The method further includes determining a count of one or more reflected probe packets received from the responder device and determining a frame loss measurement based on the count of the one or more reflected probe packets.

According to yet another embodiment, one or more computer-readable non-transitory storage media embody instructions that, when executed by a processor, cause the processor to perform operations. The operations include determining a replication factor and duplicating one or more original probe packets according to the replication factor, resulting in one or more replicated probe packets. The operations also include transmitting a set of probe packets to a responder device, the set of probe packets including the one or more original probe packets and the one or more replicated probe packets. The operations further include determining a count of one or more reflected probe packets received from the responder device and determining a frame loss measurement based on the count of the one or more reflected probe packets.

Technical advantages of certain embodiments of this disclosure may include one or more of the following. Certain embodiments of this disclosure duplicate generated probe packets, thereby increasing the number of probe packets that are available for service-level agreement testing according to some ITU-T standardized methodologies. With the understanding that certain network components have a lower bandwidth for generating probe packets than for forwarding packets, this disclosure assists network devices in being able to implement certain network testing methodologies. This may facilitate more efficient network testing.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

FIG. 1 illustrates an example system 100 for measuring frame loss in high-bandwidth service provider networks. System 100 or portions thereof may be associated with an entity, which may include any entity, such as a business, company, or enterprise, that generates risk scores. In certain embodiments, the entity may be a service provider that provides networking services. The components of system 100 may include any suitable combination of hardware, firmware, and software. For example, the components of system 100 may use one or more elements of the computer system of FIG. 3. In the illustrated embodiment of FIG. 1, system 100 includes a test device 102, a packet generator 104, a network processor 106, a responder device 108, and a network 110.

Network 110 of system 100 represents any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined wide area network (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110.

Network 110 may include one or more nodes. Nodes may be points within network 110 that receive, create, store and/or send data along a path. Nodes may include one or more redistribution points that recognize, process, and forward data to other nodes of network. Nodes may include virtual and/or physical nodes. In certain embodiments, nodes include one or more virtual machines, hardware devices, bare metal servers, and the like. In some embodiments, nodes may include data communications equipment such as computers, routers, servers, printers, workstations, firewalls, switches, bridges, modems, hubs, and the like. Nodes may use static and/or dynamic routing to send data to and/or receive data to other nodes of system 100. In some embodiments, test device 102 and responder device 108 are nodes included in network 110.

Test device 102 of system 100 represents any hardware, software, firmware, or combination thereof that is capable of generating, transmitting, and/or receiving probe packets to facilitate a network service test, such as ITU-T Y.1564. Test device 102 may comprise different components for handling packet generation, packet transmission, and packet reception. For example, test device 102 may comprise packet generator 104 and network processor 106. Test device 102 may include an interface that facilitates communication with a user, which may allow the user to request test device 102 to perform a test procedure (e.g., Y.1564). In some cases, a user may remotely request (e.g., via network 110) test device 102 to perform a test procedure. In the context of Ethernet service activation tests, test device 102 may generally be referred to as a "master unit" or a "generator" which generates test traffic used in a service activation test and gathers or analyzes test results.

Packet generator 104 of system 100 represents any hardware, software, firmware, or combination thereof that is capable of generating data (e.g., in the form of packets). In some cases, packet generator 104 may be implemented as a host network processing unit (NPU) (e.g., a particular type of central processing unit (CPU)) as part of a router, or packet generator 104 may be implemented as a device that is external to a router. In some cases, packet generator 104 may generate packets used in network test procedures, such as Operations, Administration, and Maintenance (OAM) packets, which may be referred to more generally as probe packets. In some embodiments, packet generator 104 may generate probe packets as Frame Loss Protocol Data Units (FLPDUs), as defined by the Metro Ethernet Forum, for example. For example, a probe packet may include an Ether-type field, a source Medium Access Control (MAC) address field, a destination MAC address field, and a Quality of Service (QoS) field. Packet generator 104 may have an available bandwidth for generating data (e.g., probe packets), where the available bandwidth for generating data represents a maximum number of bits per second that packet generator 104 is capable of generating.

Network processor 106 of system 100 represents any hardware, software, firmware, or combination thereof that is capable of processing packets that are sent from or received by packet generator 104. In some cases, network processor 106 may be implemented as a network processor that is included in a router. Network processor 106 may be connected to or otherwise in communication with one or more network and/or fabric interfaces that facilitate data transfer between test device 102 and network 110. Network processor 106 may have a supported link bandwidth for transmitting and/or receiving data, where the supported link bandwidth represents a maximum amount of data (as measured in bits per second) that network processor is capable of transmitting and/or receiving.

In some embodiments, packet generator 104 may be capable of determining the supported link bandwidth of network processor 106. Packet generator 104 may determine a replication factor based on the supported link bandwidth and the available bandwidth for generating data. For example, packet generator 104 may determine the replication factor according to the following formula: $N=(S/G)-1$, where N equals the replication factor, S equals the supported link bandwidth for transmitting (and/or receiving) data, and G equals the available bandwidth for generating data.

In some embodiments, packet generator 104 may be unable to generate packets at the available bandwidth for generating packets. For example, when a service activation test is requested by a user, packet generator 104 may be dedicating processing resources to one or more other operations performed by packet generator 104 such that packet generator 104 is unable to generate packets at the available bandwidth for generating packets during the service activation test. Accordingly, packet generator 104 may determine a configured bandwidth for generating packets and use the configured bandwidth for generating packets to determine a replication factor. For example, packet generator 104 may determine the replication factor according to the following formula: $N=(S/C)-1$, where N equals the replication factor, S equals the supported link bandwidth for transmitting (and/or receiving) data, and C equals the configured bandwidth for generating data.

The configured bandwidth for generating data may be statically configured (e.g., by a user, a developer, or a system administrator). For example, a developer of packet generator 104 may configure the configured bandwidth for generating data to be a first value, such as 1 gigabits per second (Gbps). Accordingly, packet generator 104 may be capable of performing a service activation test, for example, even when packet generator 104 cannot dedicate its full processing power to generating traffic for the test.

Upon determining a replication factor, packet generator 104 may program (e.g., using a secure application programming interface (API) or a Yet Another Next Generation (YANG) model) network processor 106 to duplicate a probe packet generated by packet generator 104 (i.e., an "original probe packet") according to the replication factor (i.e., N times) in the event that the replication factor has a value that is a positive number. Upon receiving an original probe packet from packet generator 104, network processor 106 may then duplicate the original probe packet according to the replication factor (i.e., N times), resulting in N replicated probe packets. Each replicated probe packet may be an exact copy of the original probe packet from which it is duplicated, except that network processor 106 may alter a sequence identification number associated with each replicated probe packet such that each probe packet (i.e., each original probe packet and each replicated probe packet) has a unique sequence identification number. Network processor 106 may then transmit the original probe packet and the N replicated probe packets (collectively, the "set of probe packets") to responder device 108 via network 110.

Responder device 108 of system 100 represents any hardware, software, firmware, or combination thereof that is capable of reflecting one or more probe packets that are received from network processor 106. In the context of Ethernet service activation tests, responder device 108 may generally be referred to as a "responder," which serves as a destination for test traffic used in a service activation test. Responder device 108 may reflect a probe packet received from network processor 106 by transmitting a packet (i.e., a "reflected probe packet") to network processor 106 such that the reflected probe packet includes the same payload as the probe packet received from network processor 106. The reflected probe packet may include a different header (e.g., source MAC address and/or destination MAC address values) than that of a probe packet received from network processor 106, or the reflected probe packet may include a same header as that of a probe packet received from network processor 106. Upon receiving a reflected probe packet from responder device 108, network processor 106 may determine that a probe packet corresponding to the reflected probe packet was not lost during transit in network 110.

Upon receiving a reflected probe packet from responder device 108, network processor 106 may check the reflected probe packet against a permission (e.g., as defined by an access control list (ACL)). A permission may be a command or other directive that processor 106 follows when one or more fields of a received packet have some designated value(s). Packet generator 104 may program (e.g., using a secure API or a YANG model) network processor 106 with one or more permissions. For example, packet generator 104 may program network processor 106 to keep a count of the reflected probe packets that network processor 106 receives from responder device 108. Because a reflected probe packet may be a copy (or a near copy with slight differences to some fields) of a probe packet that is generated by packet generator 104, packet generator 104 may define a permission based on values of one or more fields of generated probe packets. For example, a permission may instruct network processor 106 to drop a received probe packet and increment a counter by a value of one (1) whenever network processor 106 receives a reflected probe packet. The permission may define a reflected probe packet as a packet with particular values of one or more fields (e.g., a source MAC address field or a destination MAC address field), or as a packet that is formatted as an FLPDU frame.

Network processor 106 may keep a count of reflected probe packets that are received from responder device 108 based on its application of one or more permissions, as discussed above. After some period of time (e.g., according to a timer that starts when packet generator 104 begins generating probe packets), network processor 106 may transmit the count of reflected probe packets to packet generator 104, which may then remove any programmed permissions and replication factor from network processor 106. Packet generator 104 may then compare the count of reflected probe packets with the number of generated probe packets. Any difference between the count of reflected probe packets and the number of generated probe packets may result in a frame loss measurement that reflects a number of probe packets that were lost in network 110. Test device 102 may then communicate the frame loss measurement to a user. As such, system 100 allows users of network 110 to test the quality of network 110 (e.g., in a service activation test), even when the users do not have access to test devices that are capable of generating the amount of test data needed to perform such a test.

Although FIG. 1 illustrates a particular number of test devices 102, packet generators 104, network processors 106, responder devices 108, and networks 110, this disclosure contemplates any suitable number of test devices 102, packet generators 104, network processors 106, responder devices 108, and networks 110. For example, system 100 may include more than one network 110.

Although FIG. 1 illustrates a particular arrangement of test devices 102, packet generators 104, network processors 106, responder devices 108, and networks 110, this disclosure contemplates any suitable arrangement of test devices 102, packet generators 104, network processors 106, responder devices 108, and networks 110. For example, test device 102 and packet generator 104 may be implemented as a single component that is external to, but communicatively coupled with, network processor 106.

Furthermore, although FIG. 1 describes and illustrates particular components, devices, or systems carrying out particular actions, this disclosure contemplates any suitable combination of any suitable components, devices, or systems carrying out any suitable actions.

Figure 2:
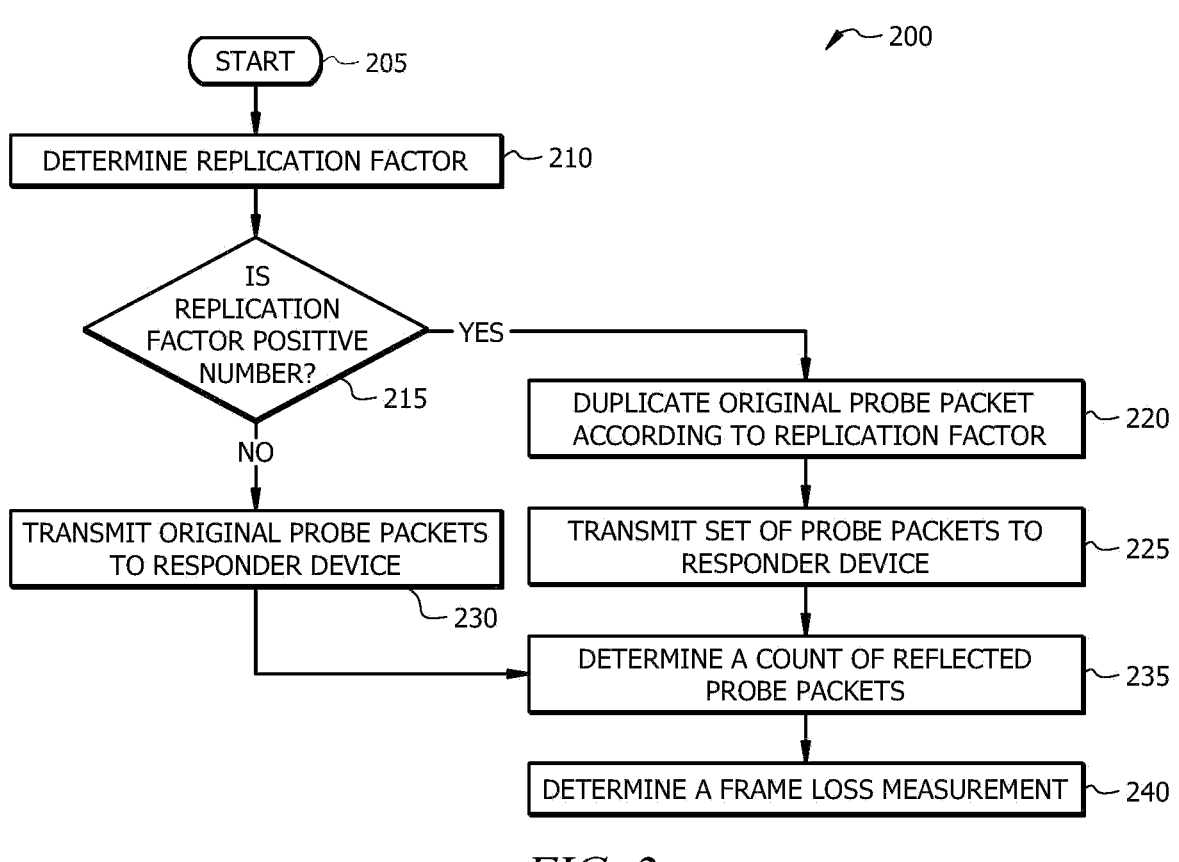
FIG. 2 illustrates an example method for measuring frame loss in high-bandwidth service provider networks.

FIG. 2 illustrates an example method 200 for measuring frame loss in high-bandwidth service provider networks. Method 200 begins at step 205. At step 210 of method 200, a packet generator determines a replication factor. For example, referring to FIG. 1, packet generator 104 may determine a replication factor. The replication factor may be based on a supported link bandwidth for transmitting data and an available bandwidth for generating first data and second data. For example, the packet generator may determine that the packet generator has an available bandwidth of 100 Gbps for generating data. The packet generator may determine that a network processor with which the packet generator is in communication has a support link bandwidth of 400 Gbps for transmitting data. Accordingly, the packet generator may determine the replication factor to be three (3) using the equation for determining a replication factor described above with respect to FIG. 1. In some cases, the packet generator may determine the replication factor following a user requesting (e.g., via an interface) that packet generator perform a service activation test (e.g., Y.1564). Method 200 then moves from step 210 to step 215.

At step 215 of method 200, the packet generator determines if the replication factor is a positive number. For example, referring to FIG. 1, packet generator 104 of system 100 may determine if the replication factor is a positive number. A replication factor that is a positive number may indicate that a supported link bandwidth for transmitting data exceeds an available bandwidth for generating data, and that the packet generator is not capable of generating an amount of data needed to run a network test, (e.g., Y.1564). A replication factor that is a negative number or zero (0) may indicate that a supported link bandwidth for transmitting data is less than or equal to an available bandwidth for generating data, and that the packet generator is capable of generating an amount of data needed to run a network test. If the packet generator determines that the replication factor is a positive number, method 200 then moves from step 215 to step 220.

At step 220 of method 200, the packet generator generates one or more original probe packets and a network processor duplicates the one or more original probe packets according to the replication factor. For example, referring to FIG. 1, packet generator 104 may generate one or more original probe packets and network processor 106 may duplicate the one or more original probe packet according to the replication factor. The packet generator may generate the one or more original probe packets at the available bandwidth for generating data (e.g., 100 Gbps). In the event that the replication factor is not a whole number (e.g., is a fraction), the packet generator may generate the one or more original probe packets at some reduced bandwidth that is a factor of the supported link bandwidth for transmitting data (i.e., a value that leaves no remainder when the value of the supported link bandwidth is divided by the reduced bandwidth) and re-determine a replication factor based on the reduced bandwidth.

The packet generator may generate original probe packets such that they are formatted as FLPDU frames, for example. The packet generator may set the destination MAC address field of the one or more original probe packets as a MAC address associated with a responder device (e.g., referring to FIG. 1, responder device 108). The packet generator may set the source MAC address field of the one or more original probe packets as a MAC address associated with the packet generator (e.g., a MAC address of the packet generator, a MAC address of the network processor, or a MAC address of a test device associated with the network processor). In certain embodiments, the packet generator generates different types of original probe packets. An original probe packet's type may be based on the value of a QoS field of the original probe packet, which may indicate a packet color (e.g., green, yellow, or red) of the original probe packet.

The packet generator may assign each original probe packet a sequence identification number, where the value of a sequence identification number may be equal to the value of the previous sequence identification number plus the replication factor plus one (1). For example, when the replication factor is three (3), a first original probe packet may be assigned a first sequence identification number with a value of zero (0) and a second original probe packet may be assigned a second sequence identification number with a value of four (4) (i.e., the sum of the first sequence identification number plus the replication factor plus one (1)). And a third original probe packet may be assigned a third sequence identification number with a value of eight (8) (i.e., the sum of the second sequence identification number plus the replication factor plus one (1)).

The packet generator may cause the network processor to duplicate the one or more original probe packets by programming the network processor with the replication factor. The network processor may then duplicate the one or more original probe packets according to the replication factor. That is, network processor may duplicate each original probe packet according to the replication factor (i.e., N times, where N equals the replication factor), resulting in N replicated probe packets for every one original probe packet. Each replicated probe packet may be an exact copy of the original probe packet from which it is duplicated, except that the network processor may alter a sequence identification number associated with each replicated in accordance with the order of duplication. For example, a first replicated probe packet that is a first duplicate of a first original probe packet associated with a first sequence identification number may have a second sequence identification number whose value is one (1) greater than the first sequence identification number; a second replicated probe packet that is a second duplicate of the first original probe packet associated with the first sequence identification number may have a third sequence identification number whose value is two (2) greater than the first sequence identification number; and so on.

In certain embodiments, the packet generator may program the network processor with one or more access control lists (ACLs) that direct the network processor's handling of packets that are received by the network processor. For example, the network processor may be programmed with one or more ACLs that direct network processor to drop (i.e., discard) a packet that is either received from a particular device (e.g., as indicated by the value of a source MAC address field of the packet) or formatted in a particular manner (e.g., as an FLPDU frame). In some cases, an ACL may direct the network processor to increment a particular counter by a value of one (1) whenever the network processor receives and drops a qualifying packet. Accordingly, the packet generator may program the network processor to keep a first count of packets associated with a first packet type (e.g., a green packet color) that are received from a particular device (e.g., the responder device, such as, referring to FIG. 1, responder device 108), to keep a second count of packets associated with a second packet type (e.g., a yellow packet color) that are received from the particular device, and to keep a third count of packets associated with a third packet type (e.g., a red packet color) that are received from the particular device. The packet generator may also start a timer at this step. Method 200 then moves from step 220 to step 225.

At step 225 of method 200, the network processor transmits the original probe packets and the replicated probe packets (i.e., the "set of probe packets") to a responder device. For example, referring to FIG. 1, network processor 106 may transmit the set of probe packets to responder device 108. The network processor may transmit the set of probe packets to the responder device via a network (e.g., referring to FIG. 1, network 110), which may be an Ethernet network. The network processor may transmit the set of probe packets to the responder device as a burst at the available bandwidth for transmitting data (e.g., 400 Gbps). Method 200 then moves to step 235.

If, at step 215, the packet generator determines that the replication factor is not a positive number (e.g., zero (0) or a negative number), then, at step 230 of method 200, the packet generator generates one or more original probe packets and passes the one or more original probe packets to the network processor, which then transmits the one or more original probe packets to the responder device. For example, referring to FIG. 1, packet generator 104 may determine that the replication factor is not a positive number, generate one or more original probe packets, and pass the original probe packets to network processor 106, which may then transmit the original probe packets to responder device 108. A replication factor that is a negative number or zero (0) may indicate that the network processor's supported link bandwidth for transmitting data is less than or equal to the packet generator's available bandwidth for generating data such that the packet generator is capable of generating an amount of data needed to run a test. Accordingly, the packet generator may determine that duplication of the original probe packets is not necessary to run the test. The packet generator may then generate one or more original probe packets as described above in reference to step 220 of FIG. 2. The packet generator may also program the network processor with one or more ACLs and start a timer as described above in reference to step 220 of FIG. 2. Method 200 then moves to step 235.

At step 235 of method 200, the responder device transmits one or more reflected probe packets to the network processor, and the network processor determines a count of reflected probe packets. For example, referring to FIG. 1, responder device 108 may transmit one or more reflected probe packets to network processor 106, and network processor 106 may determine a count of reflected probe packets. Upon receiving a probe packet from the network processor (e.g., one or more of the set of probe packets transmitted by the network processor as described in step 225 of method 200 or one or more of the original probe packets transmitted by the network processor as described in step 230 of method 200), the responder device may reflect the received probe packet back to the network processor. That is, the responder device may transmit a packet (e.g., a "reflected probe packet") to the network processor that includes the same payload as the probe packet received from the network processor. In some cases, the reflected probe packet may include a different header than that of the probe packet received from the network processor. For example, a source MAC address field of the reflected probe packet may have a MAC address field with a value associated with the responder device and may have a destination MAC address field with a value associated with the network processor.

Upon receiving a reflected probe packet from the responder device, the network processor may check the reflected probe packet against an ACL programmed by the packet generator (e.g., as described above with reference to step 220 of method 200). If the received probe packet matches one or more criteria of the ACL (e.g., includes one or more fields with particular value(s)), the network processor may complete an action as directed by the ACL. For example, upon determining that a first received probe packet includes a destination MAC address field with a value associated with the responder device and a QoS field associated with a first packet type (e.g., a packet color of green), the network processor may determine to drop (i.e., discard) the first received probe packet and increment a first counter by one (1). Upon determining that a second received probe packet includes a destination MAC address field with a value associated with the responder device and a QoS field associated with a second packet type (e.g., a packet color of yellow), the network processor may determine to drop (i.e., discard) the second received probe packet and increment a second counter by one (1). Upon determining that a third received probe packet includes a destination MAC address field with a value associated with the responder device and a QoS field associated with a third packet type (e.g., a packet color of red), the network processor may determine to drop (i.e., discard) the third received probe packet and increment a third counter by one (1). Accordingly, the network processor may keep one or more counts of reflected probe packets that are successfully received by the network processor, and may do so on a packet-type basis. Method 200 then proceeds to step 240.

At step 240 of method 200, the packet generator determines a frame loss measurement. For example, referring to FIG. 1, packet generator 104 may determine a frame loss measurement. After some specified period of time elapses (e.g., after the timer described above with reference to step 220 of method 200 expires), the packet generator may request the network processor to transmit the one or more counts of reflected probe packets to the packet generator. After receiving the one or more counts of reflected probe packets from the network processor, packet generator may remove the one or more ACLs and the replication factor from the network processor.

The packet generator may determine a frame loss measurement based on the one or more counts of reflected probe packets. For example, the packet generator may compare the one or more counts of reflected probe packets with a number of expected probe packets, where the number of expected probe packets may be the number of probe packets transmitted by the network processor at step 225 or step 230 of method 200. The packet generator may determine that the frame loss measurement is the difference between the number of expected probe packets and the one or more counts of reflected probe packets.

In some cases, the frame loss measurement may measure frame loss on a packet-type basis. For example, the packet generator may compare a number of expected packets of a first type (e.g., packets with a green packet color) with the first counter maintained and transmitted by the network processor to determine a frame loss measurement for packets of the first type. The packet generator may compare a number of expected packets of a second type (e.g., packets with a yellow packet color) with the second counter maintained and transmitted by the network processor to determine a frame loss measurement for packets of the second type. The packet generator may compare a number of expected packets of a third type (e.g., packets with a red packet color) with the third counter maintained and transmitted by the network processor to determine a frame loss measurement for packets of the third type. Accordingly, the packet generator may determine how many packets of a particular type were successfully transmitted to and reflected by the responder device.

The packet generator may then communicate (e.g., via an interface) the frame loss measurement to a user. The user may then determine whether the frame loss measurement complies with a requirement or standard of a service-level agreement of the network through which the packets are transmitted (e.g., referring to FIG. 1, network 110). In some cases, the packet generator may determine whether the frame loss measurement complies with a requirement or standard of a service-level agreement of the network based on knowing the requirements or standards of the service-level agreement (e.g., as indicated by the user). In such cases, the packet generator may communicate to the user whether the frame loss measurement complies with a requirement or standard of a service-level agreement of the network.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates an example method 200 for measuring frame loss in high-bandwidth networks including the particular steps of the method of FIG. 2, this disclosure contemplates any suitable method for measuring frame loss in high-bandwidth networks, which may include all, some, or none of the steps of the method of FIG. 2, where appropriate. Although FIG. 2 describes and illustrates particular components, devices, or systems carrying out particular actions, this disclosure contemplates any suitable combination of any suitable components, devices, or systems carrying out any suitable actions.

Figure 3:
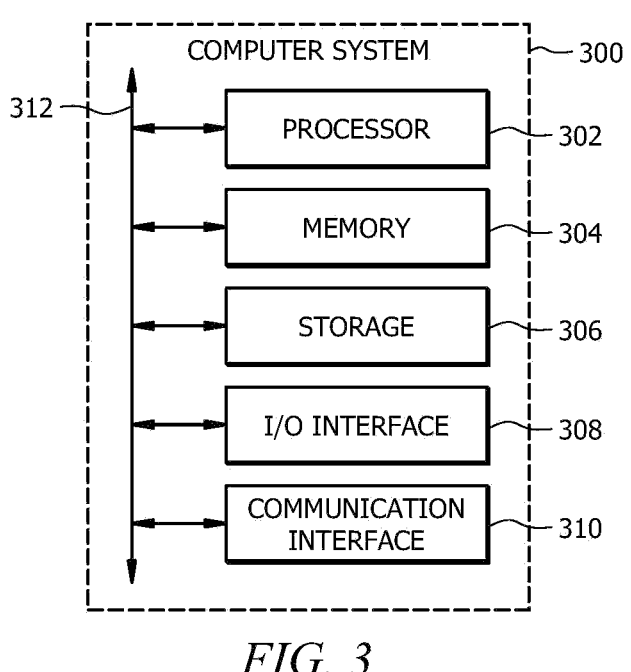
FIG. 3 illustrates an example computer system that may be used by the systems and methods described herein.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) (e.g., synchronous DRAM (SDRAM) or double data rate SDRAM (DDR SDRAM)), static RAM (SRAM), non-volatile RAM (NVRAM), or any other RAM variant. Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or Universal Serial Bus (USB) drive or a combination of two or more of these. Storage 306 may include removable or non-removable (or fixed) media, where appropriate. Storage 306 may be internal or external to computer system 300 (e.g., cloud storage), where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network component comprising one or more processors and one or more computer-readable non-transitory storage media coupled to the one or more processors and including instructions that, when executed by the one or more processors, cause the network component to perform operations comprising:

determining a replication factor based on a first variable G and a second variable S, wherein the first variable G equals a maximum rate at which the network component is capable of generating data and the second variable S equals a supported link bandwidth for transmitting data;

performing a duplication of one or more original probe packets according to the replication factor, resulting in one or more replicated probe packets;

altering a sequence identification number associated with each of the one or more replicated probe packets in accordance with an order of the duplication;

transmitting a set of probe packets to a responder device, the set of probe packets comprising the one or more original probe packets and the one or more replicated probe packets;

determining a count of one or more reflected probe packets received from the responder device; and determining a frame loss measurement based on the count of the one or more reflected probe packets.

2. The network component of claim 1, wherein the replication factor N equals (S/G)−1.

3. The network component of claim 1, wherein the supported link bandwidth represents a maximum number of bits per second for transmitting data.

4. The network component of claim 1, wherein a reflected probe packet of the one or more reflected probe packets is a packet transmitted by the responder device in response to the responder device receiving a probe packet from the set of probe packets.

5. The network component of claim 1, wherein determining the count of the one or more reflected probe packets received from the responder device further comprises incrementing a counter by a value of 1 each time a reflected probe packet of the one or more reflected probe packets is received.

6. The network component of claim 1, wherein determining the frame loss measurement based on the count further comprises determining a number of probe packets of a particular type that are received from the responder device.

7. The network component of claim 1, the operations further comprising:

determining whether the frame loss measurement complies with a service-level agreement.

8. A method, comprising:

determining a replication factor based on a first variable G and a second variable S, wherein the first variable G equals a maximum rate at which a network component is capable of generating data and the second variable S equals a supported link bandwidth for transmitting data;

performing a duplication of one or more original probe packets according to the replication factor, resulting in one or more replicated probe packets;

altering a sequence identification number associated with each of the one or more replicated probe packets in accordance with an order of the duplication;

transmitting a set of probe packets to a responder device, the set of probe packets comprising the one or more original probe packets and the one or more replicated probe packets;

determining a count of one or more reflected probe packets received from the responder device; and determining a frame loss measurement based on the count of the one or more reflected probe packets.

9. The method of claim 8, wherein the replication factor N equals (S/G)−1.

10. The method of claim 8, wherein the supported link bandwidth represents a maximum number of bits per second for transmitting data.

11. The method of claim 8, wherein a reflected probe packet of the one or more reflected probe packets is a frame transmitted by the responder device in response to the responder device receiving a probe packet from the set of probe packets.

12. The method of claim 8, wherein determining the count of the one or more reflected probe packets received from the responder device further comprises incrementing a counter by a value of 1 each time a reflected probe packet of the one or more reflected probe packets is received.

13. The method of claim 8, wherein determining the frame loss measurement based on the count further comprises determining a number of probe packets of a particular type that are received from the responder device.

14. The method of claim 8, further comprising:

determining whether the frame loss measurement complies with a service-level agreement.

15. One or more computer-readable non-transitory storage media embodying instructions that, when executed by a processor, cause the processor to perform operations comprising:

determining a replication factor based on a first variable G and a second variable S, wherein the first variable G equals a maximum rate at which a network component is capable of generating data and the second variable S equals a supported link bandwidth for transmitting data;

performing a duplication of one or more original probe packets according to the replication factor, resulting in one or more replicated probe packets;

altering a sequence identification number associated with each of the one or more replicated probe packets in accordance with an order of the duplication;

transmitting a set of probe packets to a responder device, the set of probe packets comprising the one or more original probe packets and the one or more replicated probe packets;

determining a count of one or more reflected probe packets received from the responder device; and determining a frame loss measurement based on the count of the one or more reflected probe packets.

16. The one or more computer-readable non-transitory storage media of claim 15, wherein the replication factor N equals $(S/G)-1$.

17. The one or more computer-readable non-transitory storage media of claim 15, wherein the supported link bandwidth represents a maximum number of bits per second for transmitting data.

18. The one or more computer-readable non-transitory storage media of claim 15, wherein a reflected probe packet of the one or more reflected probe packets is a frame transmitted by the responder device in response to the responder device receiving a probe packet from the set of probe packets.

19. The one or more computer-readable non-transitory storage media of claim 15, wherein determining the count of the one or more reflected probe packets received from the responder device further comprises incrementing a counter by a value of 1 each time a reflected probe packet of the one or more reflected probe packets is received.

20. The one or more computer-readable non-transitory storage media of claim 15, wherein determining the frame loss measurement based on the count further comprises determining a number of probe packets of a particular type that are received from the responder device.

* * * * *